US012076753B2

(12) United States Patent
Michalko et al.

(10) Patent No.: US 12,076,753 B2
(45) Date of Patent: Sep. 3, 2024

(54) MACHINE TO RECEIVE FOOD CONTAINERS TO BE REUSED

(71) Applicant: CARTER-HOFFMANN LLC, Mundelein, IL (US)

(72) Inventors: Kelly Michalko, Mundelien, IL (US); Nikolas Shield, Mundelien, IL (US)

(73) Assignee: CARTER-HOFFMANN, LLC, Mundelein, IL (US)

( * ) Notice: Subject to any disclaimer, the term of this patent is extended or adjusted under 35 U.S.C. 154(b) by 0 days.

(21) Appl. No.: 17/730,622

(22) Filed: Apr. 27, 2022

(65) Prior Publication Data

US 2023/0347385 A1 Nov. 2, 2023

(51) Int. Cl.

| | |
|---|---|
| ***G07F 7/06*** | (2006.01) |
| ***B07C 5/34*** | (2006.01) |
| ***B07C 5/36*** | (2006.01) |

(52) U.S. Cl.

CPC ............ *B07C 5/3404* (2013.01); *B07C 5/362* (2013.01); *G07F 7/0609* (2013.01); *B07C 2501/0045* (2013.01)

(58) Field of Classification Search

CPC ....... B07C 5/3404; B07C 5/3412; B07C 5/36; B07C 2501/0045; G07F 7/0609; B65F 1/1431

See application file for complete search history.

(56) References Cited

U.S. PATENT DOCUMENTS 4,519,306 A * 5/1985 LaBarge ................. B30B 9/321 100/215
4,579,216 A * 4/1986 DeWoolfson ......... G07F 7/0609 100/902

(Continued)

FOREIGN PATENT DOCUMENTS

DE 19780553 7/1998
KR 1020090043107 5/2009

OTHER PUBLICATIONS

Today Show, "Starbucks announces plans to introduce reusable cups," The machine displayed and used in the Today Show story is based upon a disclosure by the assignee of the joint inventors who obtained the subject matter disclosed directly from the joint inventors—in accordance with 35 USC 102(b)(1)(a), accessed on the Internet at: https://www.today.com/video/inside-starbucks-plans-to-introduce-reusable-cups-136020037991. (Mar. 23. 2022).

Treehugger, "Take a Reusable Coffee Mug to go at Berkely Cafes," accessed on the Internet at: https://www.treehugger.com/take-reusable-coffee-mug-go-berkelex-cafes-4852058 (Mar. 29, 2022).

(Continued)

*Primary Examiner* — Joseph C Rodriguez
(74) *Attorney, Agent, or Firm* — Barnes & Thornburg LLP

(57) ABSTRACT

A machine to receive and store only specific used food containers is provided. The machine includes a housing with an interior volume and an outer shell, the housing comprises an inlet opening. A rotatable plate is positioned within the housing and aligned with the inlet opening such that items passed through the inlet opening are received upon the plate, the plate further comprises a shroud along a majority of a circumference of the plate and a void that exists where the shroud does not extend, wherein an item can be positioned upon the plate when the void of the shroud is aligned with the inlet opening and items are prevented from being positioned upon the plate when the void of the shroud is aligned with the inlet opening. A sensor is disposed upon the housing to monitor the inlet opening and identify when an object is placed upon the plate.

24 Claims, 12 Drawing Sheets

(56) References Cited

U.S. PATENT DOCUMENTS

| | | | | | |
|---|---|---|---|---|---|
| 5,248,102 | A * | 9/1993 | Bohn | B02C 19/0087 241/DIG. 38 |
| 5,423,492 | A * | 6/1995 | Willis | B02C 19/0087 209/919 |
| 5,630,493 | A * | 5/1997 | DeWoolfson | B65F 1/0033 194/209 |
| 6,112,904 | A | 9/2000 | Ajo | |
| 8,471,165 | B2 * | 6/2013 | Jokhovets | B07C 5/3408 209/523 |
| 8,718,818 | B2 * | 5/2014 | Nordbryhn | G07F 7/0609 700/240 |
| 8,851,265 | B2 * | 10/2014 | Morishita | B28B 3/02 194/208 |
| 2008/0018210 | A1 * | 1/2008 | Hayes | G07F 17/12 312/215 |
| 2014/0147005 | A1 * | 5/2014 | Kavli | G07F 7/0609 382/103 |

OTHER PUBLICATIONS

Vessel, "How it Works for Users," accessed on the Internet at: https://vesselworks.org/customers (Mar. 29, 2022).

Search Report & Written Opinion issued in PCT/US2022/027827 (Jan. 31, 2023).

* cited by examiner

MACHINE TO RECEIVE FOOD CONTAINERS TO BE REUSED

TECHNICAL FIELD

This disclosure relates to system to accept used food containers. Often take out or counter service restaurants or food and beverage establishments (e.g. coffee shops), grocery stores, or other establishments will include both trash and recycling receptacles to accept trash and recycling from customers. In situations where the establishment uses food containers that are intended to be washed and reused—the receptacles may also accept re-usable containers. It is desired to provide a machine that will accept only certain re-usable containers in an automated fashion.

BRIEF SUMMARY

A first representative embodiment of the disclosure is provided. The embodiment includes a method of receiving a plurality of food items. The method includes using an electronic reader to read an image affixed to an object, and communicating data corresponding to the read image to a controller. The controller compares the data received from the electronic reader with data that is stored within a non-volatile memory and corresponds to one or more of a plurality of types of food containers that can be received, and determines if there is a match between the data corresponding to the read image and the data corresponding to the one or more of the plurality of types of food containers that can be received stored within the non-volatile memory. A sensor that is disposed within a housing monitors an inlet opening within the housing and monitors whether the object is placed upon a plate positioned proximate to the inlet opening, wherein the sensor sends a signal to the controller when the sensor identifies that an object is placed upon the plate. The controller determines that there is a match and receives the signal that the sensor has identified that the object is placed upon the plate, the controller causes the plate to rotate, wherein the plate includes a portion that extends to the inlet opening and a remaining portion that remains within an internal volume of the housing. Rotation of the plate causes the object to move into the internal volume of the housing and with continued rotation to fall off the plate and into a container positioned within the internal volume.

A second representative embodiment of the disclosure is provided. The embodiment includes a machine to receive used food containers. The machine includes a housing that includes an interior volume and an outer shell, the housing comprises an inlet opening and an access opening into the housing. A rotatable plate is positioned within the housing and aligned with respect to the inlet opening such that items passed through the inlet opening are received upon the plate, the plate further comprises a shroud that extends along a majority of a circumference of the plate and a void that exists where the shroud does not extend, wherein an item can be positioned upon the plate when the void of the shroud is aligned with the inlet opening and items are prevented from being positioned upon the plate when the void of the shroud is aligned with the inlet opening. A sensor is disposed upon the housing to monitor the inlet opening and identify when an object is placed upon the plate.

Advantages of the present disclosure will become more apparent to those skilled in the art from the following description of the preferred embodiments of the disclosure that have been shown and described by way of illustration.

As will be realized, the disclosed subject matter is capable of other and different embodiments, and its details are capable of modification in various respects. Accordingly, the drawings and description are to be regarded as illustrative in nature and not as restrictive.

DETAILED DESCRIPTION OF THE PREFERRED EMBODIMENTS

Turning now to FIGS. 1-10*a*, a machine 10 to receive used food containers is provided. The machine 10 is typically a container that may be movable (such as on wheels or castors) or may be configured to remain in a desired location. This specification refers to a machine for the sake of brevity, which should be understood broadly to include a system or a cabinet or a container that includes the structure and functionality that is described herein.

The machine 10 is configured to identify food containers, typically of the type sold at the facility where the container is provided, but also capable of being positioned at other locations, and upon identification that the object presented is a food container this is to be accepted by the machine to facilitate that the machine becomes aligned to receive the food container and store the food container within an internal volume of the machine. For the sake of clarity, the terms “object” and “food container” are used synonymously within this specification. One of skill in the art will understand that when the system identifies that the object presented to the reader is one that the machine is configured to accept, the object placed within the machine is a "food container" Z that is desired to be accepted by the machine. The internal volume may have a bin that can conveniently be removed from the internal volume to allow for convenient removal and handling of the food containers received within the bin, such as for cleaning for future use at the facility or to be recycled, or other potential uses. The machine 10 is adapted to prevent acceptance of food containers within the internal volume when the machine does not identify that the object presented is a food container that is to be accepted by the machine.

The machine 10 is used in order to receive specific used food containers Z from customers and allow the containers Z to be cleaned and re-used within the facility (or within a network of facilities) or to be recycled. As discussed in detail below, the machine 10 includes a reader 30 that serves one and possibly two purposes. A first purpose is to identify a food container Z being presented to the machine 10 and allow for a determination of whether the food container Z is desired to be received by the machine 10 and based upon that determination to allow the food container to be received. A second purpose may be to receive an identification about an account (i.e. a customer's account) that is associated with the person that is presenting the food container Z to the machine, so that upon acceptance of the food container Z the customer's account may receive a credit—such as a credit against future purchases at the facility using the customer's account or a credit for future non-purchase items (e.g. reward points, customer loyalty levels, etc.), or a rebate or a discount or the like.

Figure 1:
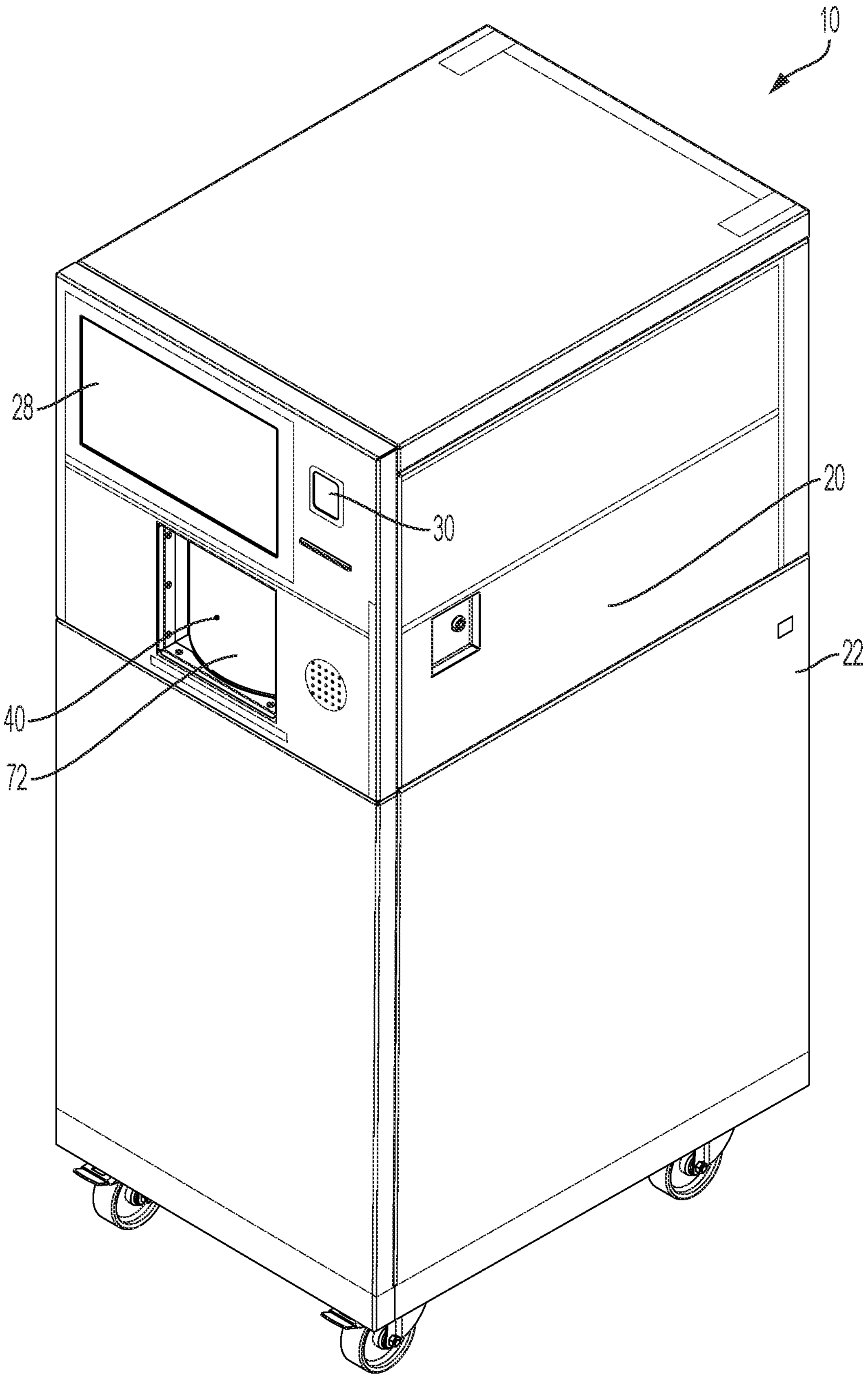
FIG. 1 is a perspective view of an machine to receive food containers to be reused, with the machine aligned to prevent receipt of food containers.

As best shown in FIG. 1, the machine 10 includes a housing 20 that is made up of outer walls 22 that form an outer shell, such as top, bottom, left and right sides, and front and back walls 22 that collectively form an internal volume 24. The housing may be rectangular or other volumes and may be configured to be received in specific or convenient locations within a facility. In some embodiments, the machine 10 may be aligned to be placed proximate to a trash and recycling station of a facility. In some embodiments, the housing 10 may be a different size and shape than the trash and recycling station so that it is quickly apparent to a customer of the facility that the purpose of the machine 10 is not a trash receptacle.

The housing 20 may receive a bin 200 within the housing 20, which is provided to receive the plurality of food containers Z that are accepted by the machine 10. The housing 20 may include one or more ramps 210 that are provided to interact with food containers Z that fall from the plate 60 (discussed below in detail) such that the food containers Z enter into the bin in an organized fashion to facilitate stacking or otherwise organizing the food containers Z within the bin 200. The housing 20 includes an access door 29 that can allow access or close an access opening. The access door 29 can be opened to allow the bin 200 to be removed or installed within the housing. The access door 29 may include a handle, or latch, or a lock or any combination of these items.

The housing 20 may include a reader 30 upon a front or top face (or another convenient location) thereof that is readily and ergonomically accessible by the customer. The reader 30 is configured to optically identify based upon a machine readable image provided upon the object presented, the type of food container is presented. From the information a controller 1000, which may be a part of the reader or a separate component, determines whether the object is a food container and whether the machine will accept the object for storage within an internal volume 24 of the housing 20. In some embodiments, the reader 30 (or controller 1000 as applicable—for the sake of brevity—the controller 1000 will be discussed in detail to perform the functions discussed below—but one of ordinary skill in the art with a thorough review of this specification will understand that the controller may be a part of the reader 30 with respect to this functionality) is configured to determine whether the object is a food container from the establishment where the machine is located, and in still other embodiments, the reader 30 is configured to determine whether the object is a specific type of food container (either from the establishment where the machine 10 is located, or generally) that the machine is 10 programmed to accept.

The reader 30 may be an optical system that is capable of identifying a machine readable image such as a UPC symbol, a QR code, other types of established and cataloged machine readable images, or in other embodiments a unique (and in some embodiments arbitrary) machine readable image that is capable of being identified by the reader 30 and is imprinted or otherwise affixed to the food container.

The reader 30 communicates with a controller 1000 that communicates with a non-volatile memory 1001 (either located within the machine or in other embodiments that is remote from the machine) that is programmed with data corresponding to machine readable images related to one or a plurality of types of food containers that are desired/programmed to be received within the machine 10. The communication between the controller 1000 and the non-volatile memory 1001 may be through a direct connection when the memory is located within the machine 10, or in embodiments where the non-volatile member is located remotely, the communication may be via Wi-Fi, Bluetooth, or via the internet, or other electronic communication protocols that are known in the art. In embodiments where the non-volatile memory 1001 is local, the local memory may communicate periodically with a remote server (daily, weekly, etc.) to allow for updates to the local non-volatile memory 1001 with changes to the types of food containers Z that are desired to be received.

The controller 1000 is configured to receive a communication from the reader 30 that corresponds to the type of object/food container Z is presented proximate to the reader. Different types of communications that are possible between the reader 30 and the controller 1000 are well understood in the art to allow the controller 1000 to receive information to identify the type of food container Z that is presented proximate to the reader 30. The controller 1000 then compares (or causes a comparison to be performed) between the information of the type of food container Z presented and an inventory of types of food containers that are authorized to be received by the machine 10. In the event that the food container Z presented is a food container that is authorized to be received, the machine enables receipt of the food container Z as discussed below. In the event that the food container Z presented is not a food container that is authorized to be received, or is not a food container that is recognized (or in some embodiments if the controller 1000 has identified that the bin 200—when provided otherwise the internal volume 24—is already full, the machine 10 does not operate to accept the container—and instead remains oriented to prevent receipt of the food containers within the machine, as discussed below.

As mentioned above, in some embodiments, the reader 30 may also, either before or after identifying the machine readable image upon the food container Z, the reader 30 may receive information associated with the customer or person that is presenting the food container Z to the machine 10. This is accomplished for example by the user providing a machine readable image regarding their identity or preferably their account, such as a QR code image associated with the person's account from the user's mobile device (phone, tablet, computer, or the like), and such as from a dedicated APP (application) of the facility or the larger company/brand that runs the facility. Alternatively, the machine 10 may prompt the user to enter their customer number or other identifiable information about the customer—such as via a touchscreen or keyboard or other input device 28 that is associated with the machine 10. In the embodiment, the controller 1000 may accept the information associated with the customer that is presenting the food container, such that the company may provide a benefit to the customer—such as a credit or discount to future purchases, loyalty points to the customer's account, or the like. The customer information received may be communicated to a central server associated with the company to facilitate these benefits or rewards to the customer to provide an incentive for customers to deposit food containers Z into the machine 10.

The housing 20 includes an inlet opening 40 that is provided to allow food containers Z to be received within the housing 20. The housing 20 receives and rotationally supports a receiving mechanism that facilitates receipt of food containers Z and transfer of the received food containers Z into the bin 200.

The receiving mechanism may include a plate 60 and a shroud 70 that are positioned within the housing 20 such that a portion of the plate 60 extends proximate to the inlet opening 40, and in some rotational positions 70 the shroud blocks the inlet opening 40. In some embodiments discussed below, both the plate 60 and the shroud 70 are rotated in unison, while in other embodiments, the shroud 70 is rotated by the plate 60 is fixed. The embodiment where the plate and shroud 70 are rotated in unison is discussed below herein, and then followed by modifications to the system where only the shroud 70 is rotated.

The plate 40 is preferably a circular flat plate with an upper surface 61 (that faces upwardly within the housing 20) disposed proximate to a lower edge of the inlet opening 40. The plate 60 is provided to allow a food container Z that extends through the inlet opening 40 to rest upon the upper surface of the plate 60. As discussed in further detail below, when a food container Z is received upon the plate 60, the plate 60 rotates causing the food container to be moved into the housing 20 and with sufficient rotation the food container Z falls off of the plate 60 and into the bin 200. The plate 60 is connected to a motor 58 via a shaft 56 and in some embodiments a transmission 57 such that when the motor 58 is energized to rotate the shaft 56 by the controller 1000 the plate 60 rotates. In some embodiments, the motor 58 is configured to rotate the plate 60 at a constant speed, while in other embodiments, the motor 58 may rotate the plate at differing speeds, such as based upon the specific rotational position of the plate 60 within the housing 20. In some embodiments first and second switches 152 154 (discussed below) may interact directly with the plate 60 (such as a projection 66 upon the plate 60), while in other embodiments the first and second switches 302, 303 may interact with the transmission 57, or the motor shaft 56 at a position remote from the plate 60. The first and second switches 302, 303 are discussed in detail below, while the alternative first and second switches 152, 154 (when provided instead of switches 302, 303) operate with the same functionality as switches 302, 303.

The shroud 70 extends upwardly from the plate 60. An outer surface 72 of the shroud 70 is circumferential (other than portions of the shroud that define the void 76 discussed below) and in some embodiments extends along a majority of an outer circumference 63 of the plate 60. The term "extends along" is defined herein to mean that the shroud includes a uniform vertical cross-section that is the same shape as the plate 60 (typically circular but can be other shapes, elliptical, oblong, and the like) with a diameter that is the same as or about the same as the diameter of the plate. The diameter of the shroud 70 may be the same as the diameter of the plate 60, while in other embodiments the shroud may have about the same diameter as the plate 60.

Figure 2:
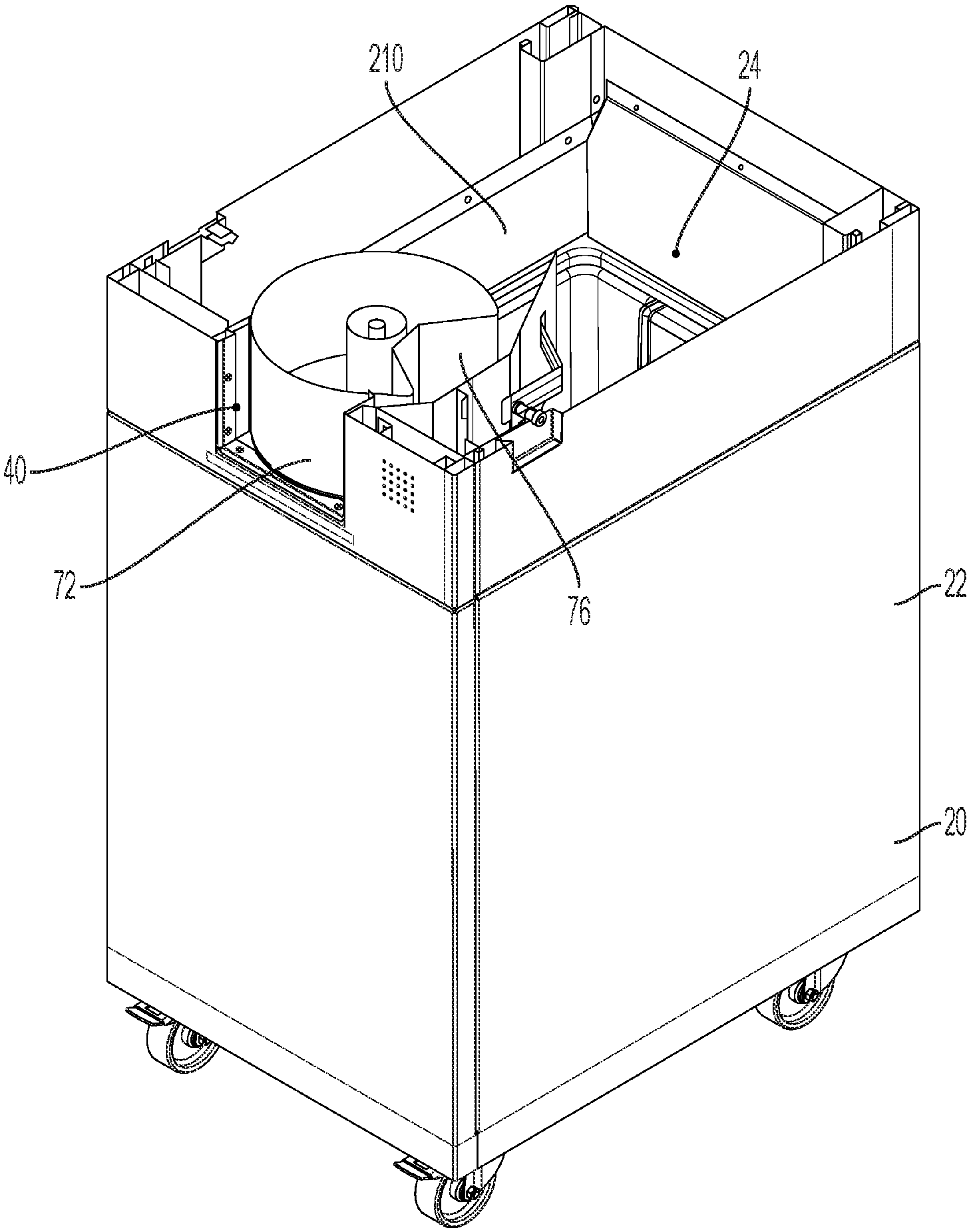
FIG. 2 is a sectional view of the machine of FIG. 1 with the machine aligned to prevent receipt of food containers.

The shroud 70 extends about the majority of the circumference of the plate 60, such as for about 300 degrees of the plate 60. One of ordinary skill in the art with a thorough review and understanding of this specification will readily understand how to size the plate 60, the shroud 70 and the void 76, and in the inlet opening 40 of the housing 20, which may vary based upon the size of the housing 20 and the size of the types of food items Z that are desired to be received by the machine 10. As best shown in FIGS. 1 and 2, when the shroud 70 is aligned with the inlet opening 40, the shroud 70 blocks the inlet opening 40 thereby preventing receipt of objects, such as food containers Z, within the housing 20 and upon the plate 60. When the shroud 70 is rotated to a position where the void 76 is aligned with the inlet opening 40, items, such as food containers Z can be positioned through the inlet opening 40 in the housing 20 and upon the plate 60 that extends proximate to the inlet opening 40.

The shroud 70 may be fixed with respect to the plate 60, and specifically the upper surface 61 of the plate 60 to establish a space X between the plate 60 and a bottom edge 75 of the shroud 70. In some embodiments, the plate 60 may be aligned below the inlet opening 40 so that space X is provided below the inlet opening 40. The shroud 70 and specifically the bottom edge 75 of the shroud 70 is aligned such that the space X extends from the outer edge 63 of the plate 60 toward the shaft 56. In some embodiments, the space X extends all of the way to the shaft 56, while in other embodiments, the bottom edge 75 of the shroud 70 may contact the upper surface of the plate proximate to the shaft 56, such that the space X extends for a distance at least one half of the radius of the plate, and in some embodiments a distance greater than one half of the radius (such as 75%, 80%, etc.). The space X is provided to allow the first and second sensors 82, 84 to monitor the area above and in some embodiments in contact with the plate 60 in locations where the respective first and second sensors 82, 84 monitor. The first and second sensors may be optical sensors that have vision that extends through the space X, discussed below. In other embodiments, the plate 60 and the shroud 70 are each fixed to the shaft 56 such that the plate 60 and shroud 70 rotate together with the shaft 56.

Figure 8:
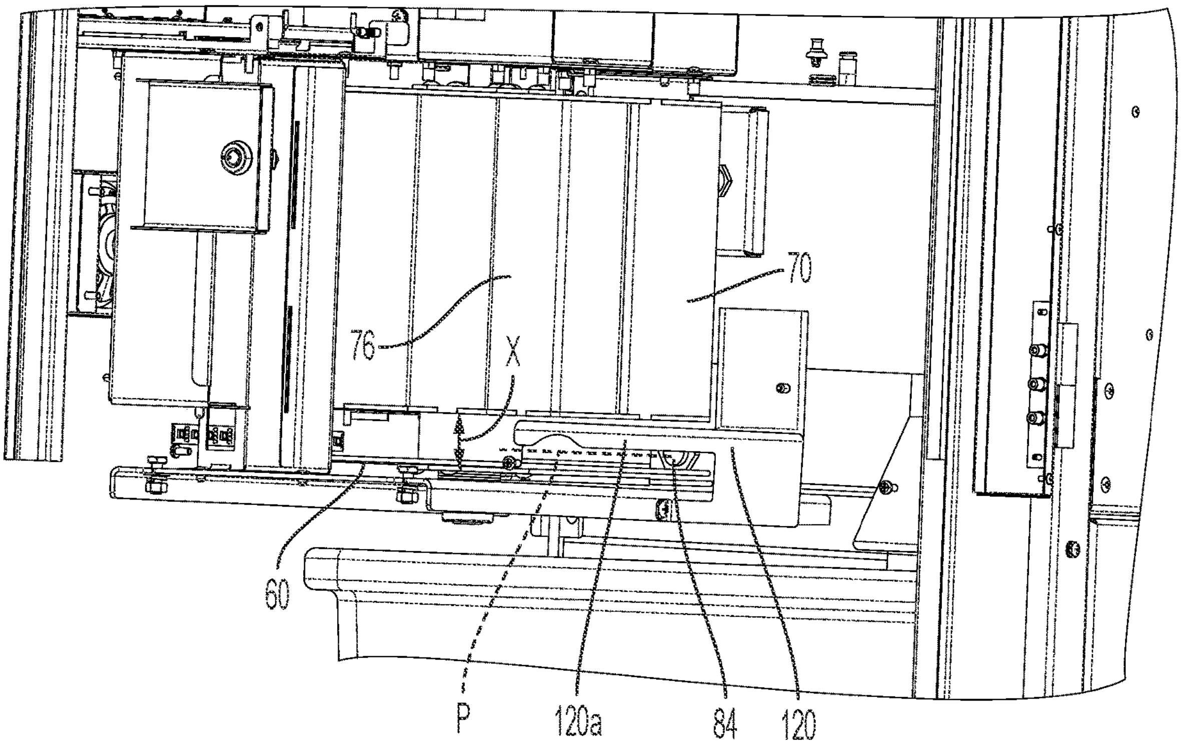
FIG. 8 is a detail side view of the shroud and the plate that depicts the space between the bottom edge of the shroud and the plate and the second sensor with a light beam through the space.
Figure 9:
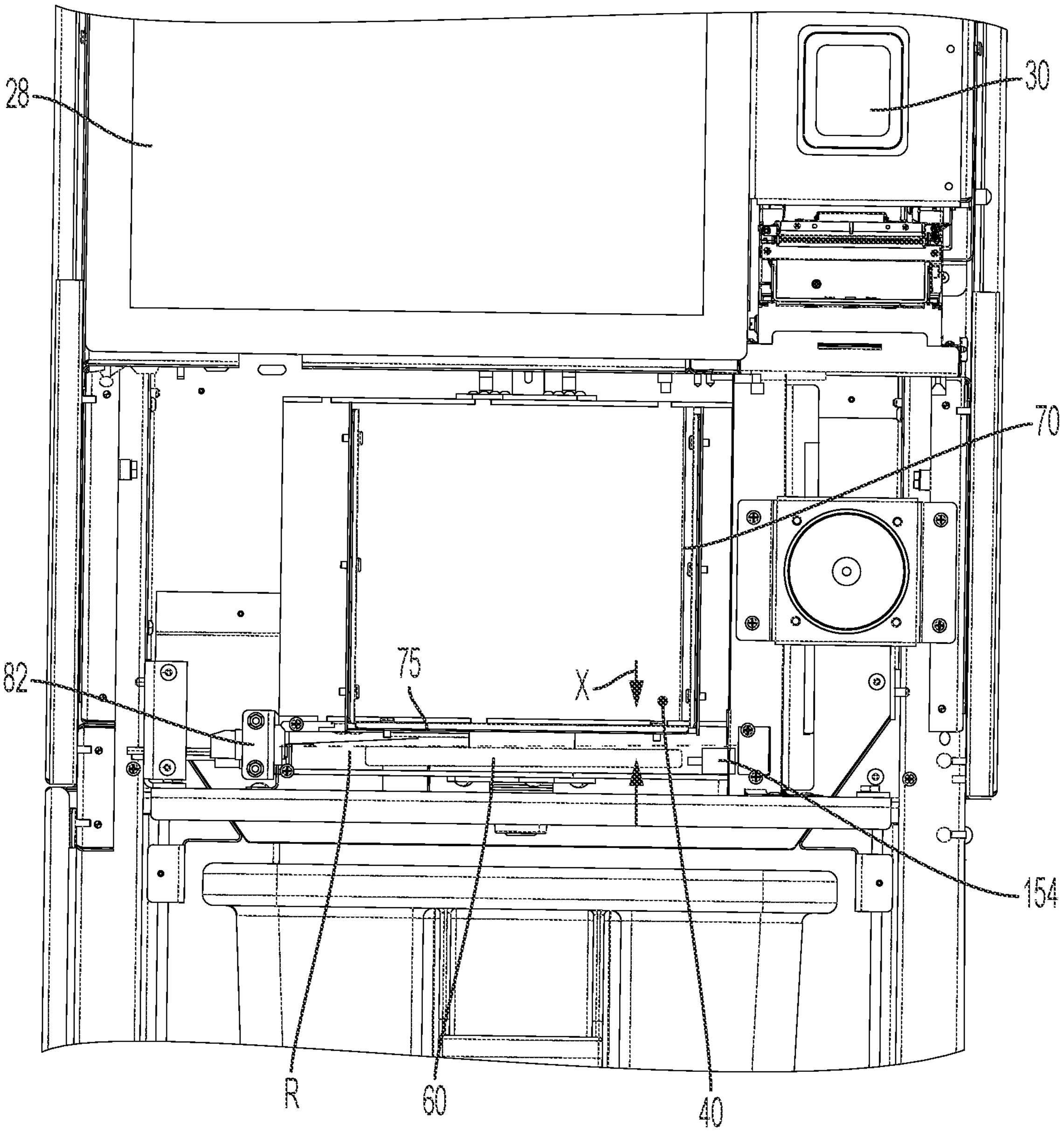
FIG. 9 is a detail front view of the shroud and the plate that depicts the space between the bottom edge of the shroud and the plate and the first sensor with a light beam through the space.

The first and second sensors 82, 84 are adapted to identify when an object is disposed within each of their line of visions (shown schematically as R and P in FIGS. 9 and 8, respectively). In some embodiments, the sensors may be positioned and calibrated to provide a signal when an object is placed within their line of vision. In other embodiments, the sensors 82, 84 may be positioned and calibrated to provide a first signal when an object is placed within their line of visions, and to send a second signal when their line of vision is not blocked by an object. Alternatively, the sensors may send a signal only when their line of vision is blocked, or still alternatively only when the line of vision is not blocked. The sensors are connected to the controller 1000 and send signals to the controller 1000, which upon receipt are used to control the operation of the machine 10 as discussed herein.

The first sensor 82 is disposed and fixed within respect to the housing 20 and is adapted to monitor the space X above the upper surface of the plate, proximate to the inlet opening 40. As best understood with respect to FIG. 9, in some embodiments the first sensor 82 sends a light beam R (which may be in the spectrum of visible light for the human eye, or outside the visible spectrum for the human eye) within the space X proximate to the inlet opening such that the light beam is blocked when an object is passed through the inlet opening proximate to the portion of the plate 60 proximate the inlet opening 40. Additionally or alternatively, the first sensor 82 may be positioned such that its light beam is blocked when an object has fully passed through the inlet opening 40 and extends within the void 76 and upon the plate 60. The term upon the plate is defined herein to include portions of the object that rest upon the plate as well as portions of the objects that are connected to the portions that rest upon the plate and are within the space X. The first sensor 82 upon identifying that its light beam R is blocked, sends a signal to the controller. In some embodiments, the first sensor 82 is positioned such that its light beam is parallel to both the upper surface of the plate 60 as well as the front face of the housing.

The second sensor 84, when provided, is disposed and fixed within the housing 20 and adapted to monitor the space X above the upper surface of the plate, within the housing, in some embodiments on an opposite side of the plate 60 (and an on opposite side of the motor shaft 56 from the first sensor 82. Like the first sensor 82, the second sensor 84 sends a light beam P (which may be in the spectrum of visible light for the human eye, or outside the visible spectrum for the human eye) within the space X such that the light beam is blocked when an object is passed through sensor's light beam. The second sensor 84 upon identifying that its light beam is blocked, sends a signal to the controller. In some embodiments, the second sensor 84 is positioned such that its light beam is parallel to both the upper surface of the plate 60 as well as the front face of the housing 20. As discussed herein, the second sensor 84 is positioned to identify when an object is disposed upon the plate 60 and rotated into a position within the housing such that when it falls off of the plate 60 it will fall into the bin 200. This data allows the controller to maintain a "count" of the number of food products Z that are stored in the bin 200 or in the internal volume 24 of the housing 20.

Figure 3:
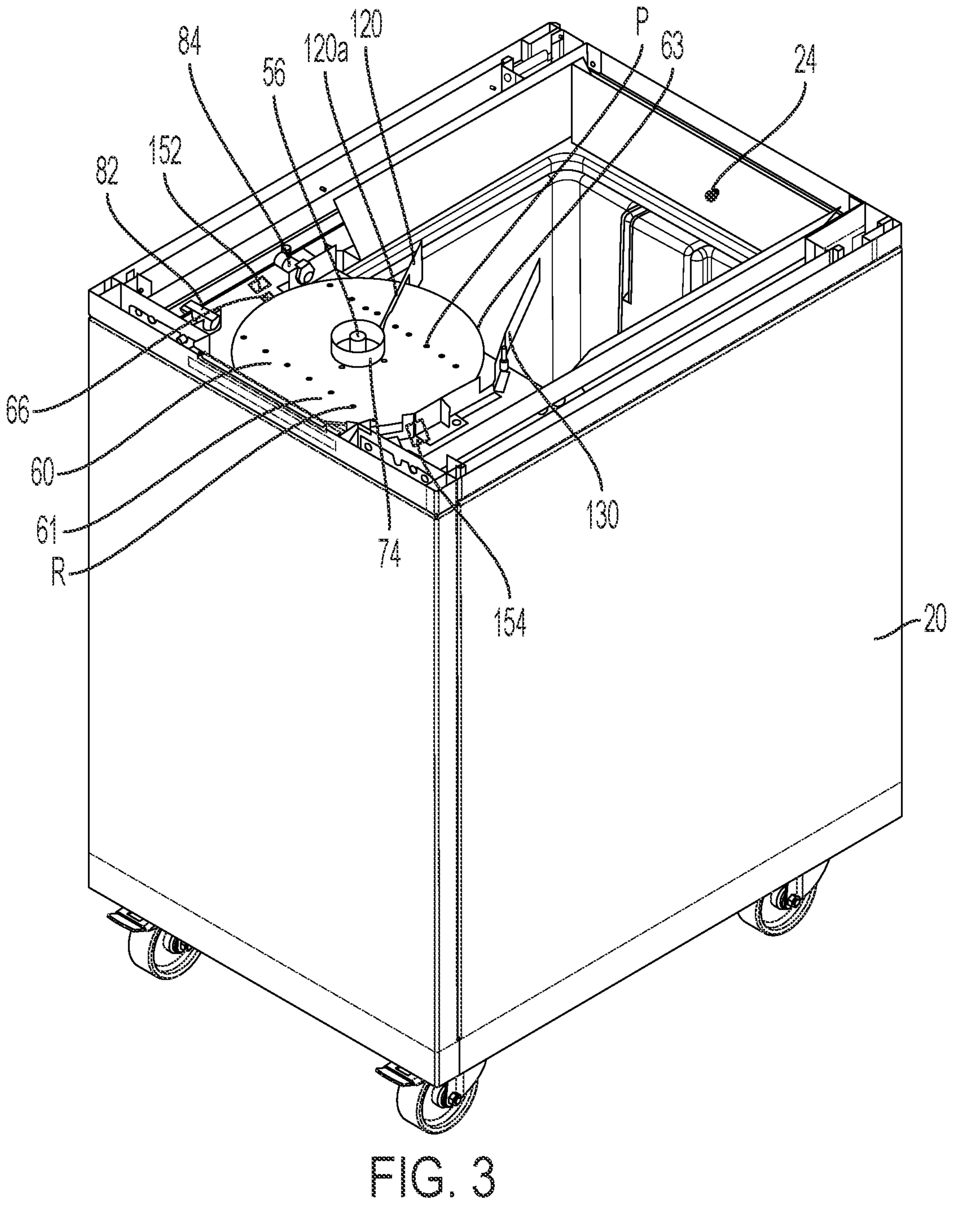
FIG. 3 is the view of FIG. 2 with the shroud removed.
Figure 4:
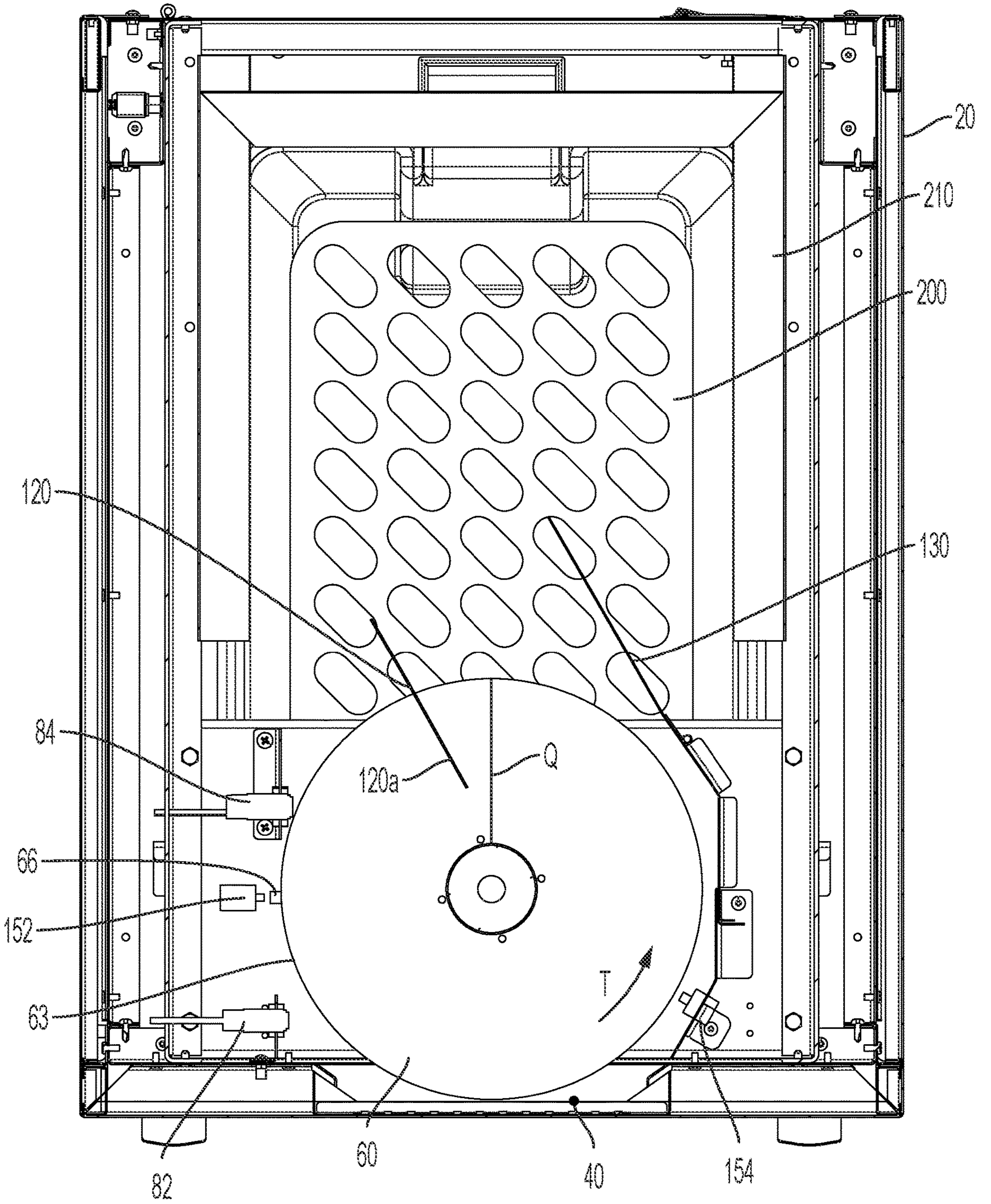
FIG. 4 is a top view of the view of FIG. 3.
Figure 6:
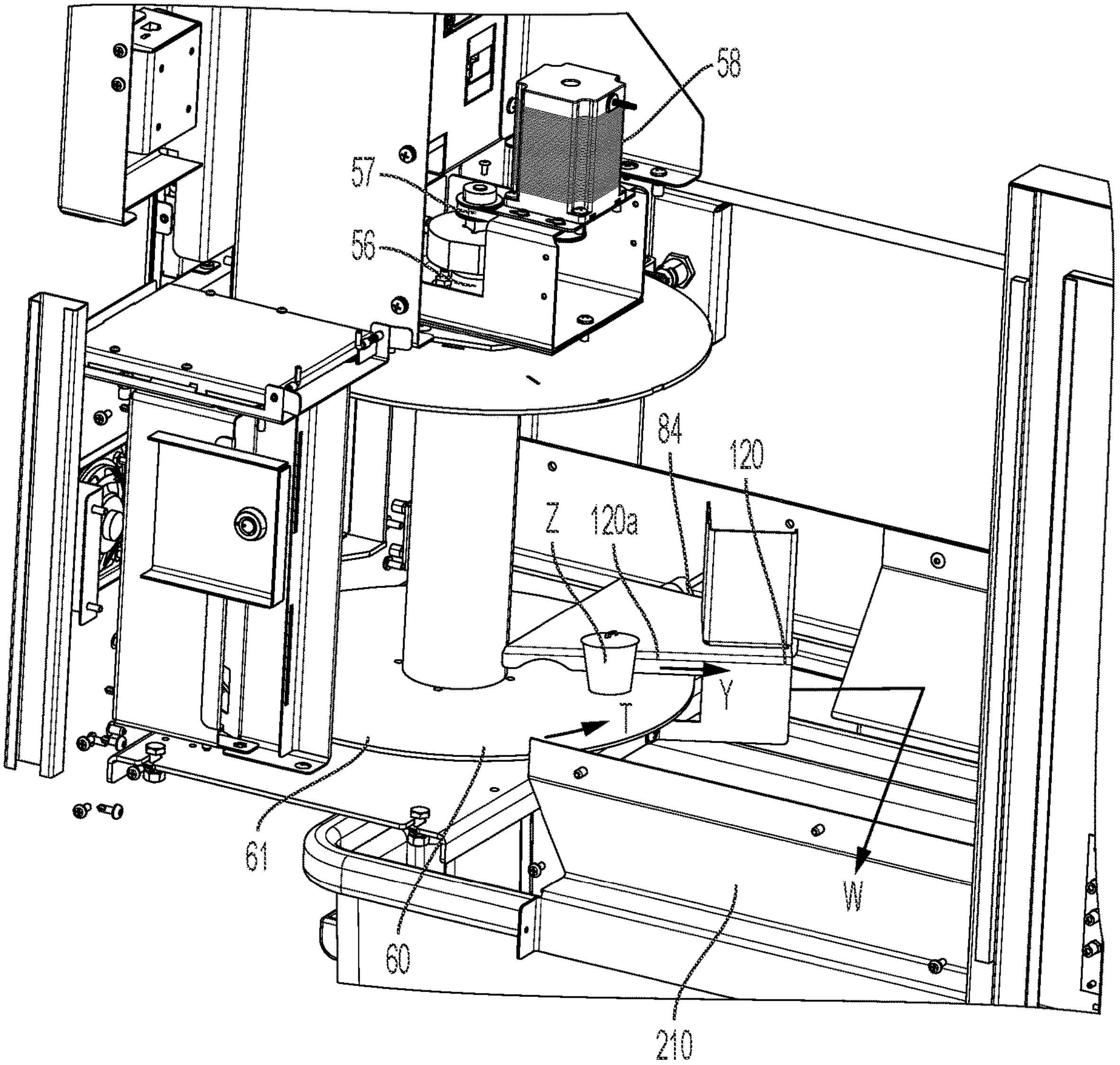
FIG. 6 is the view of FIG. 5 with the shroud removed and with the plate rotated to a further position where the food container interacts with the fence, to cause the food container to slide in the direction Y.
Figure 7:
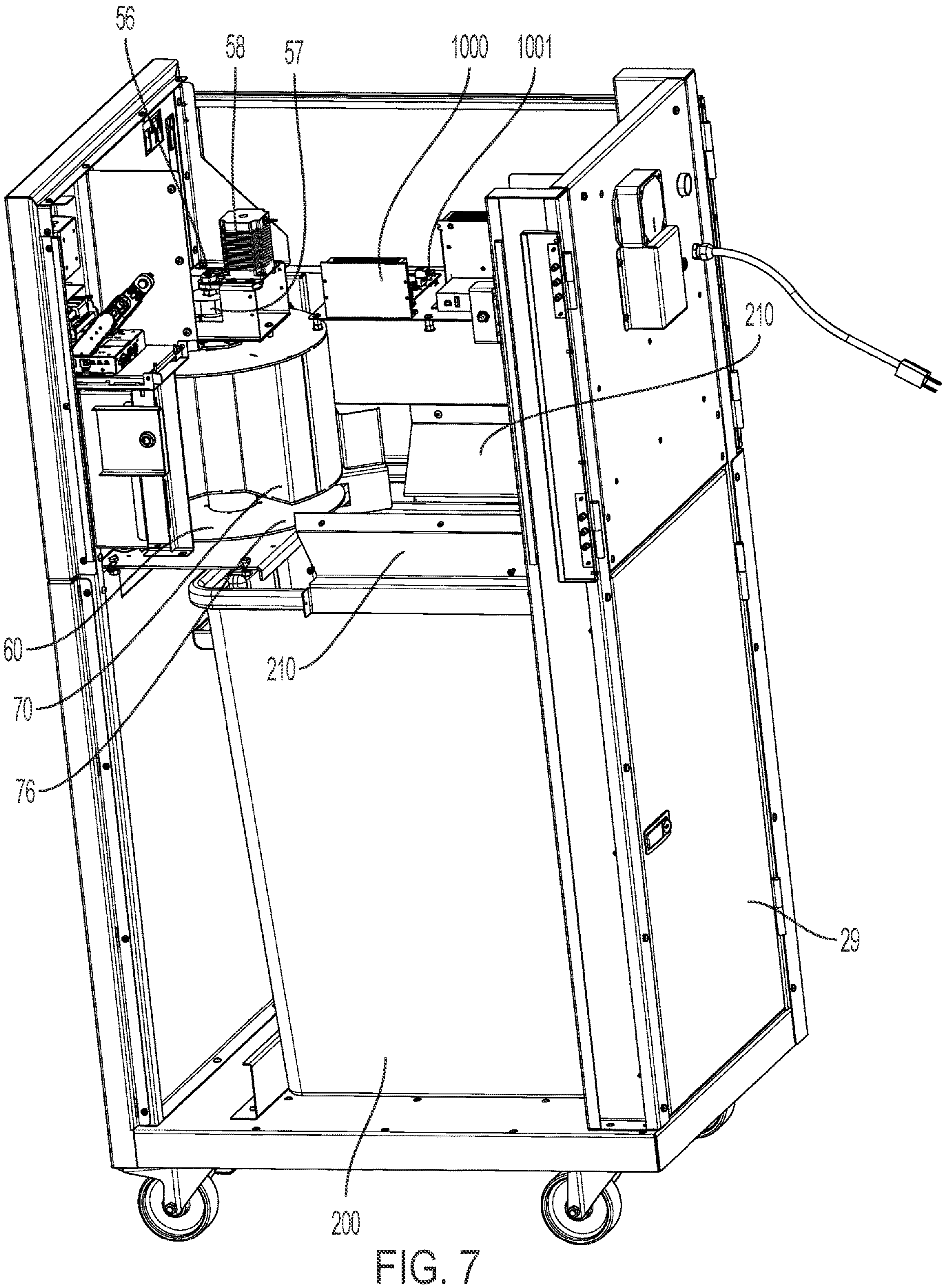
FIG. 7 is a perspective view of the housing with the shroud and plate in the orientation of FIG. 5 with a portion of the housing removed.

The housing 20 may include a fence 120 that is best understood with respect to FIGS. 3, 4, and 6. The fence 120 is fixed with respect to the housing and includes a finger 120*a* or a plate that extends above the upper surface of the plate 60 and within the space X. For the sake of brevity, the use of "finger" hereinafter refers to embodiments where the finger is a cantilevered thin member and embodiments where the finger is a plate that extends from the space X to a side wall of the housing 20. The finger 120*a* extends over the plate for a substantial distance toward the center of the plate 60 and toward the motor shaft 56 and in some embodiments to a position proximate to the motor shaft 56. The finger 120*a* may extend along a line above the plate 60 in an orientation that as the plate rotates in the direction Z, a radial line Q upon the plate 60 would cross the tip 120*b* of the finger 120*a* proximate to the shaft 56 before the radial line proximate to the outer edge 63 of the plate would cross the finger 120*a* proximate to the outer edge 63 (FIG. 4). The finger 120*a* may extend along a radial line (i.e. in a line toward the center of the plate 60 or alternatively, along a line that forms a portion of a chord of the plate 60.

Figure 5:
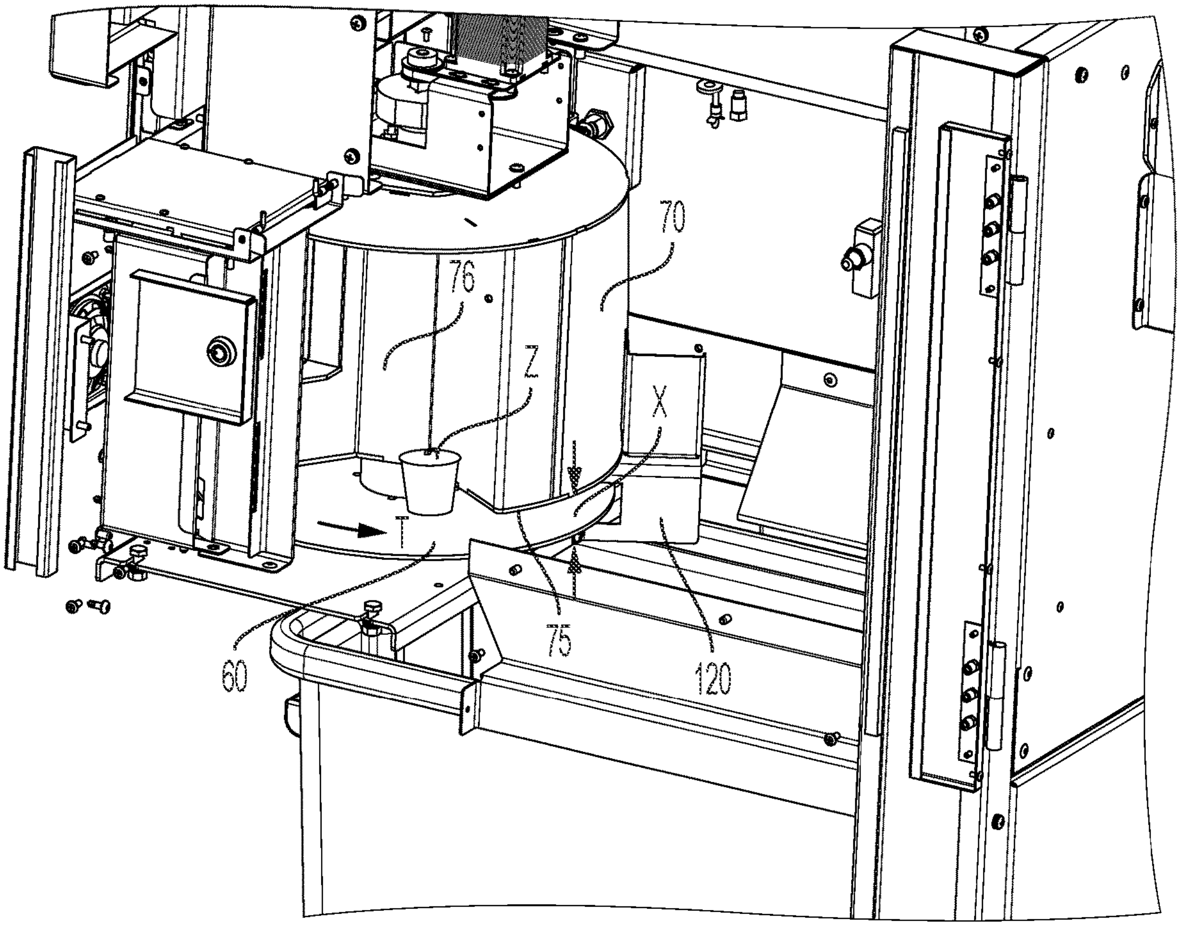
FIG. 5 is a side perspective view with a portion of the housing removed that shows a food container upon the plate and within the void in the shroud, with the plate and the shroud in a position where the food container is within the internal volume of the housing and the shroud blocking the inlet opening of the housing.

As best understood with respect to FIGS. 5 and 6, when a food container Z is positioned upon the plate 60, as the plate 60 rotates in the direction T, the food container Z approaches the finger 120*a* of the fence 120. As the food container Z contacts the fence 120 it is prevented from continuing to rotate with the plate, and instead the momentum of the food container Z causes the food container to slide along the fence 120 and the rotating plate in a direction Y radially toward the outer edge 63 of the plate 60. With sufficient travel the food container Z falls off of the plate 60 and into the bin 200 (W). In embodiments where ramps 210 are provided, the ramps 210 assist with urging the food container Z to fall into the bin 200 in a specific orientation to assist with stacking or otherwise organizing the food containers Z within the bin 200. The housing 20 may include guides 130 that guide the food container Z in extending in the direction Y when falling off the plate 60.

In some embodiments, the second sensor 84 is positioned to identify that a food container Z is proximate to contact with the fence 120. In some embodiments, the second sensor 84 is positioned to identify that the food container Z is in a position where it is in contact with the fence 120. Alternatively or inclusively, the second sensor 84 may be capable of identifying that the food container Z is sliding along the fence 120 and the plate in the direction Y. Each of these possibilities is considered to be "proximate to the fence" in accordance with this specification.

Figure 1A:
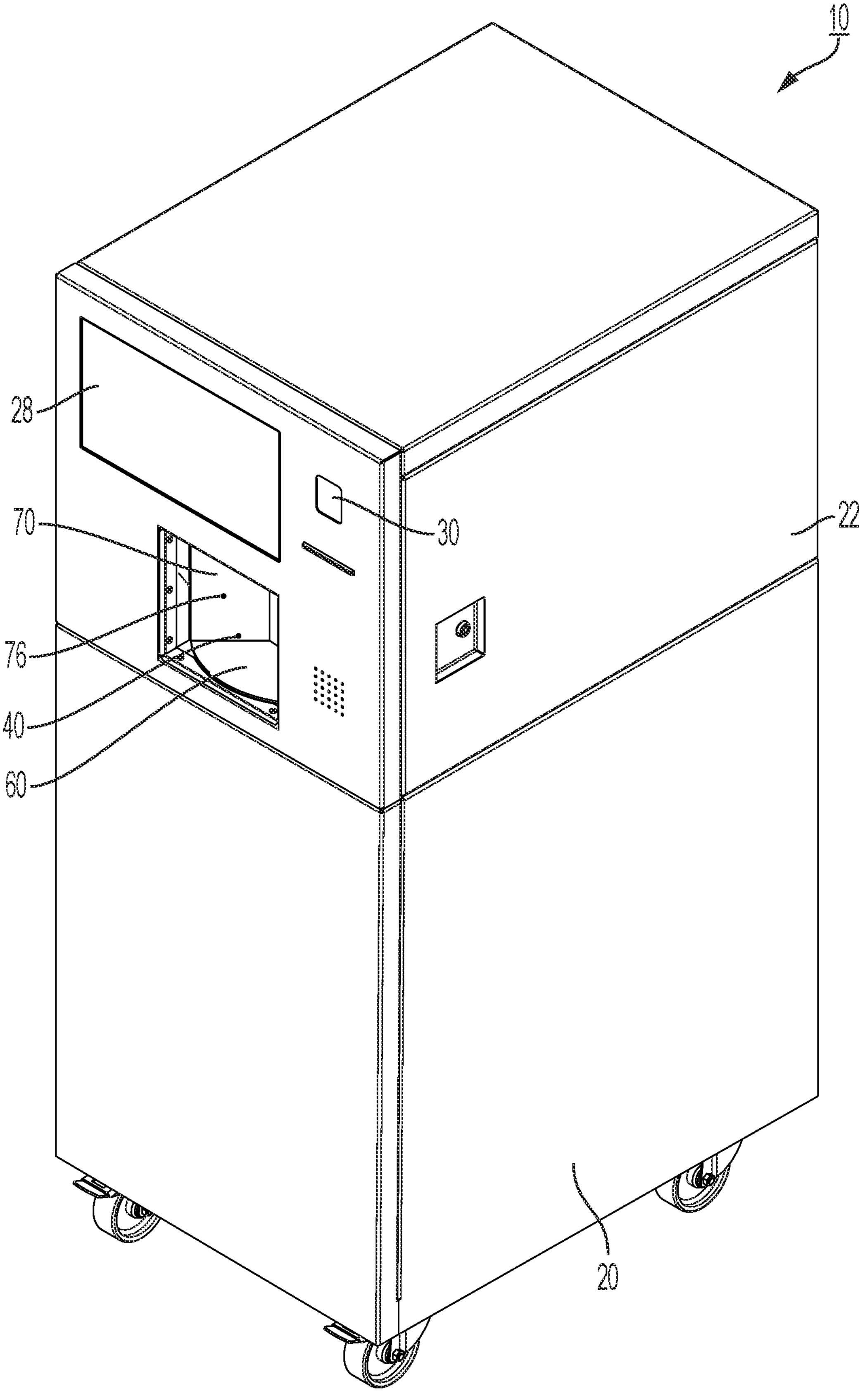
FIG. 1*a* is the view of FIG. 1 with the machine aligned to accept a food container.
Figure 2A:
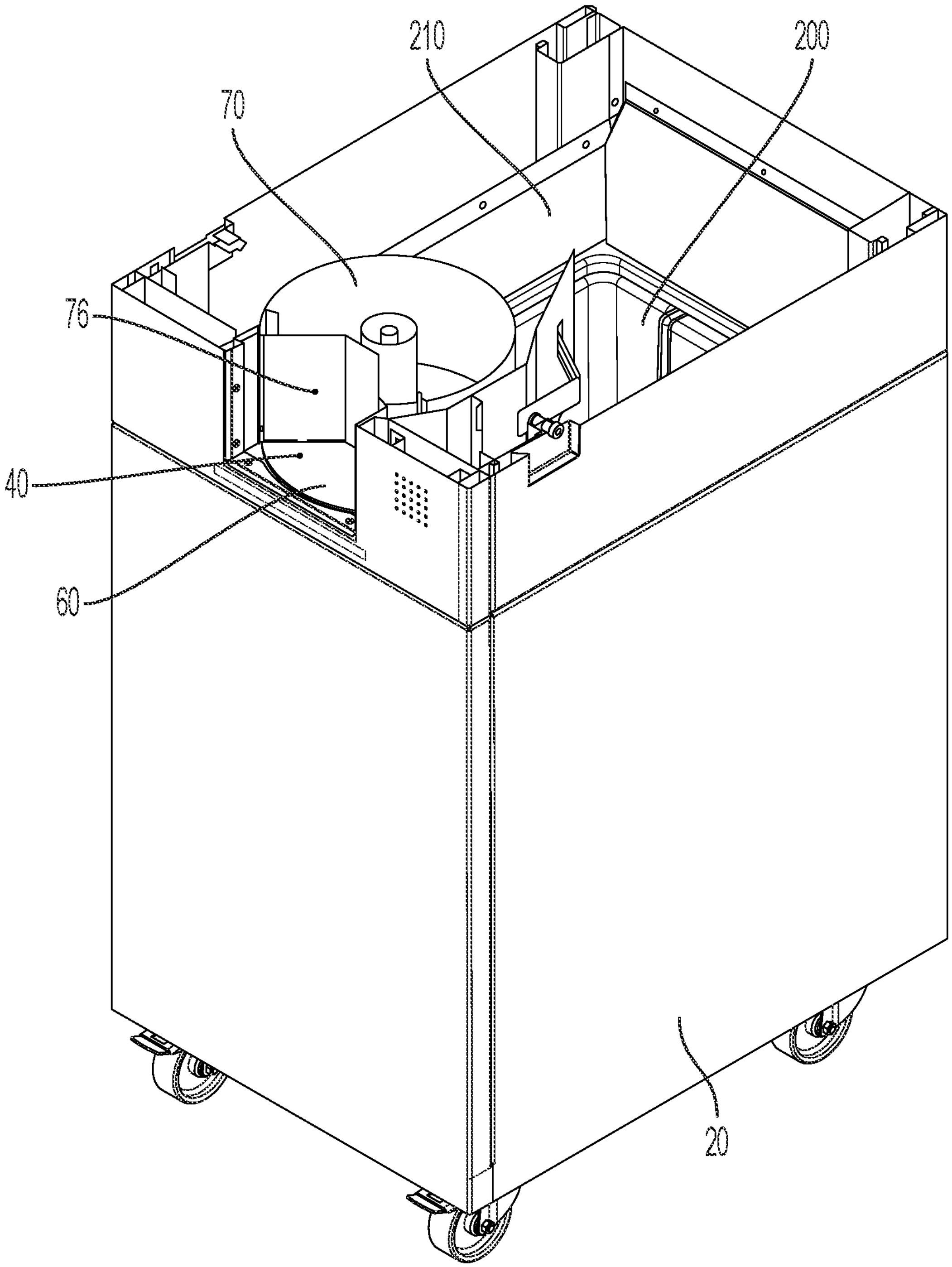
FIG. 2*a* is the view of FIG. 2 with the machine aligned to accept a food container.

The plate 60 and shroud 70 assembly may be controlled to have two stationary positions, a first position (FIGS. 1, 2) where the shroud 70 blocks the inlet opening 40 into the housing 20 and a second position (FIGS. 1*a*, 2*a*) where the void 76 in the shroud 70 is aligned with the inlet opening 40. The housing 20 may include position sensors that identify when the plate/shroud are in these respective positions and send a signal to the controller indicative of the sensed position. The position sensors may be mechanical sensors such as position switches, or electrical sensors that are adapted to identify the position of the plate 60. In other embodiments, the motor 58 or the shaft 56 may operate with an encoder that measures the angular position of the motor shaft or the shaft, and sends signals to the controller 100 representative of the rotational position of the plate 60 and the shroud 70.

In some embodiments, first and second mechanical switches 302, 303 are provided and interact with the shaft 56, and specifically a disc 56*a* that extends from the shaft 56. The first switch 302 is positioned to be closed when the shaft 56 is a position where the shroud 70 covers the inlet opening 40 in the housing 20 and at a rotational position after a food container Z that rested upon the plate 60 would have interacted with the fence 120 and fallen from the plate into the bin—which is the home position. The first switch 302 is engaged with rotation of the shaft 56 to a position of the plate 60 shortly after the rotational position where food container Z would have fallen off of the plate 60. In some embodiments, the first switch 302 is engaged at a position that is about 90 rotational degrees away from a position where the void 76 of the shroud 70 is aligned with the inlet opening 40. The second switch 303 is engaged with rotation of the shaft 56 to a position where the void 76 is aligned with the inlet opening 40.

In some embodiments, the first and second switches 302, 303 are biased to contact a disc 56 upon the shaft. The disc 56*a* includes a flat 56*b*, where the first switch 302 engages the flat 56*b* when the shroud 70 is in the home position. Alternatively, the disc 56*a* may include a projection instead of a flat 56*b* (projection not shown, but extends beyond the radius of the remainder of the disc 56*a*). When the first switch 302 engages the flat 56*b* (FIG. 10), an electrical contact is closed which allows current flow to the controller 1000. Alternatively, the first switch 302 may open a contact when engaging the flat, which stops a current flow to the controller. As discussed above, the controller 1000 identifies the step change in current flow and operates the machine accordingly, as discussed herein.

Figure 10:
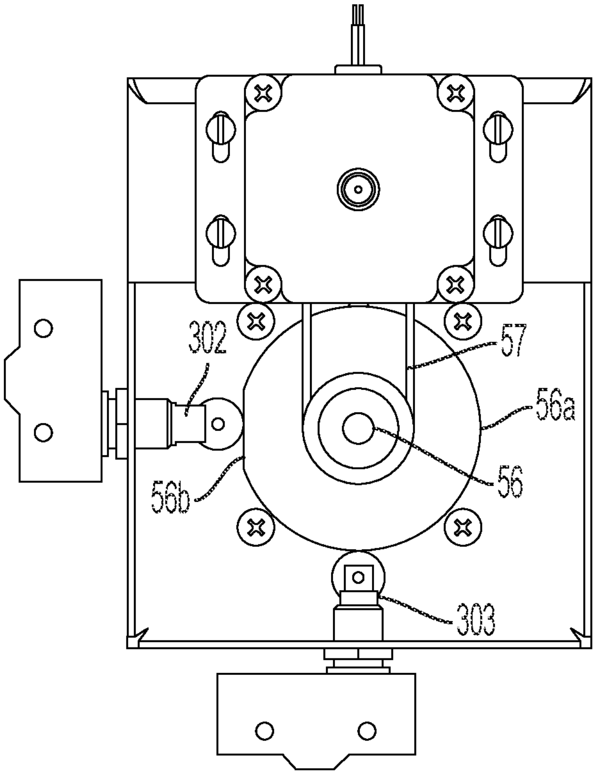
FIG. 10 is a top view of a set of first and second switches, where the first switch is engaged when the shroud is in the home position to block the inlet to the housing.
Figure 10A:
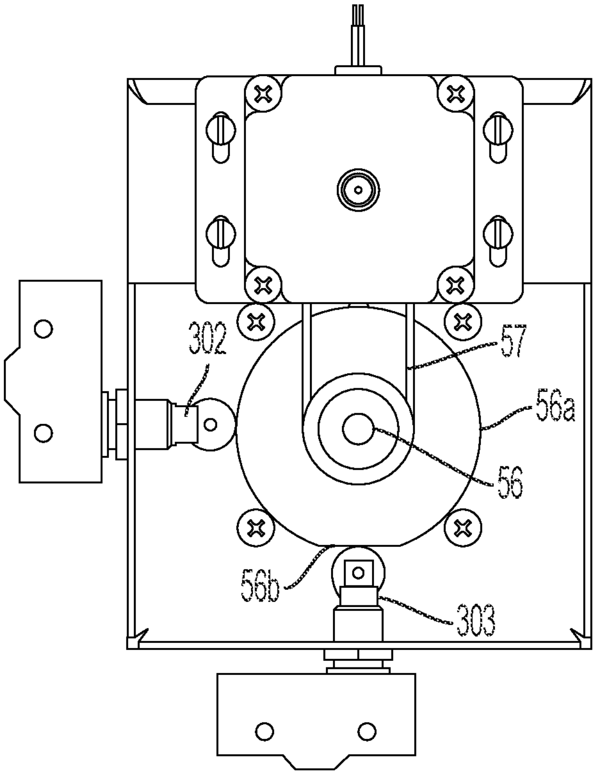
FIG. 10*a* is the view of FIG. 10 where the second switch is engaged when the shroud is in a position to align the void of the housing with the inlet into the housing.

Similarly, when the motor 58 operates the shaft 56 rotates, which rotates the shroud 70 and the plate, as well as the disc 56*a*. With rotation, the first switch 302 leaves connection with the flat 56*b*, thereby restoring the contact associated with the switch to its normal position, thereby stopping or restoring current to the controller 1000. With further rotation the void 76 in the shroud 70 rotates to a position where the void 76 is aligned with the inlet opening, and the flat 56*b* in the disc becomes aligned with the second switch 303 (FIG. 10*a*). The second switch 303 (similar to first switch 302) either closes or opens a contact, which causes a step change in current flow to the controller (either starts or stops current flow). The controller 1000 identifies this step change in current flow and identifies that the shroud 70 is position such that the void 76 is aligned with the inlet opening 40.

As discussed herein, a controller 1000 is provided to control the operation of the machine 10. The controller 1000 typically maintains the machine 10 such that the shroud 70 covers the inlet opening 40 of the housing. In embodiments where switches 302, 303 are provided, the first switch 302 is activated (such as by the switch 302 contacting a flat 56*b* on the disc 56*a* upon the shaft 56) when the shroud is in the home position with the shroud 70 covering the inlet opening 40. The controller maintains the machine at this position.

The controller 1000 continuously monitors for signals from the reader 30. When the reader 30 optically identifies a machine readable image that is positioned proximate to or in contact with the reader 30, the reader sends a signal to the controller 1000 that includes data that corresponds to the machine readable image. The controller 1000 communicates with a non-volatile memory for performing (or have performed) a comparison between the data of the machine readable image upon the object presented and the data within a saved library of corresponding with machine readable images of one or a plurality of types of food containers that can be accepted within the internal volume of the machine. Wherein the controller 1000 identifies a match between the machine readable image of the object—now considered a food container Z—presented to the reader 30 and a machine readable image of a container that can be accepted, the controller 1000 causes the motor 58 to rotate, which rotates the plate 60 and the shroud 70 to a position where the void 76 is aligned with the inlet opening 40. The controller 1000 stops the motor rotation when the second switch 303 is engaged (such as with the flat 56*b* upon the disc 56*a*) which causes a step change in current to the controller 1000 associated with the second switch 303. Upon receipt of the step change in current associated with the second switch 303, the controller discontinues rotation of the motor 58 (and therefore the plate 60 and shroud 70).

The controller 1000 then determines whether the first sensor 82 provides a signal that is actuated when an object extends through the inlet opening 40 or rests upon the plate 60. Upon receipt of the signal from the first sensor 82 (and after a sufficient delay time (e.g. 2-5 seconds)) the controller 1000 causes the motor 58 to rotate, thereby causing the plate 60 and the 70 shroud to rotate. As the plate rotates, the object that rests upon the plate 60 is withdrawn into the internal volume of the housing 20 as best shown in FIG. 5. With rotation of the shroud 70 the shroud 70 covers the inlet opening 40 to prevent objects from being put within the inlet opening 40 and into the housing 20.

The controller 1000 may further measure motor torque such that the controller stops the motor 58 when receiving a large increase in motor torque, which may indicate that there is blockage preventing the shroud from rotating to rotate the void 76 away from the inlet opening 40 (such as a user's finger or a portion of the food container extending through the inlet opening).

With continued rotation of the plate 60 and the shroud 70, the food container Z resting upon the plate 60 approaches the fence 120. As discussed above, with rotation of the plate 60, when the container contacts the fence 120 (and specifically the finger 120*a* that extends within the space X), the fence 120 urges the container Z to slide along the fence in a radial direction (direction Y) until the container falls off of the plate (direction W) (FIG. 6). The controller 1000 continues the motor 58 to rotate (thereby continuing to rotate the plate and the shroud) until the first switch 302 is again actuated—indicating that the shroud has returned to the home position. The controller 1000 maintains the system in this condition until the reader identifies the next machine readable image—and then the method starts again as discussed above.

In some embodiments, the second sensor 84 identifies when the object Z approaches into close proximity or is in contact with the fence 120. The second sensor 84 when identifying the container Z sends a signal to the controller 1000. In some embodiment, the controller 1000 upon receipt of the signal from the second sensor 84 may to its running count of items received within the housing 20 and bin 200. When the number of container Z within the housing/bin 200 reach a certain threshold, the controller 1000 may send a signal within the facility (such as via the cash register system, an inventor system, or other work flow systems) with a prompt to empty the bin 200. In some embodiments, upon receipt of the signal from the second sensor 84 the controller 1000 may cause the motor 58 to stop after specific delay time, or in embodiments where the shaft position 56 is measured by an encoder, the controller may cause the motor to stop after a predetermined amount of further rotation.

In some embodiments, when the controller 1000 determines that the food container Z presented to the reader 30 is one that can be accepted within the housing, the controller may cause a prompt to the user (via the screen 28 upon the machine) for the user to identify themselves to the machine in the various possible ways discussed herein. The user information may be used to allocate the user's account with a future credit, discount, loyalty points or the like.

In some embodiments, in the situation where the controller 1000 operates the motor 58 to the position where the second switch 303 is actuated, the controller initiates a timer when the second switch 303 is actuated. If the timer expires without the first sensor 82 identifying an food container Z passing through the inlet opening 40 and/or upon the plate 60, the controller 1000 causes the motor 58 to rotate until the plate and shroud 70 return to the home position.

As referenced above, in other embodiments, the shroud 70 may be fixed to the shaft 56 to rotate when the motor 58 shaft rotates as controlled by the controller 1000—with the controller causing the shroud 70 to rotate per the discussion above. In this embodiment, the plate is fixed within the housing 20 and is not rotatable. The rotation of the shroud 70, which causes similar rotation of the void 76 will push the food container Z received within the void 76 within the internal volume of the housing 20, and to slide along the stationary plate 60, and ultimately into the bin 200 after the food container Z interacts with the fence 120.

The term "about" is specifically defined herein to include a range that includes the reference value and plus or minus 5% of the reference value. The term "substantially the same" is satisfied when the width of the end surfaces of the holes are both within the above range.

While the preferred embodiments of the disclosed have been described, it should be understood that the invention is not so limited and modifications may be made without departing from the disclosure. The scope of the disclosure is defined by the appended claims, and all devices that come within the meaning of the claims, either literally or by equivalence, are intended to be embraced therein.

The specification as contemplated by the applicant can be best understood with reference to the following representative paragraphs:

Representative Paragraph 1: A machine to receive used food containers, comprising a housing that includes an interior volume and an outer shell, the housing comprises an inlet opening and an access opening into the housing;

a rotatable plate positioned within the housing and aligned with respect to the inlet opening such that items passed through the inlet opening are received upon the plate, the plate further comprises a shroud that extends along a majority of a circumference of the plate and a void that exists where the shroud does not extend, wherein an item can be positioned upon the plate when the void of the shroud is aligned with the inlet opening and items are prevented from being positioned upon the plate when the void of the shroud is aligned with the inlet opening;

a sensor disposed upon the housing to monitor the inlet opening and identify when an object is placed upon the plate.

Representative Paragraph 2: The machine of Representative Paragraph 1, wherein a space is defined between an upper surface of the plate and the shroud at the outer circumference of the plate, wherein the sensor is an optical sensor and has vision that extends through the space to monitor the plate.

Representative Paragraph 3: The machine of Representative Paragraph 2, wherein the space further is defined between a bottom edge of the shroud and the plate, as the shroud extends from the outer circumference of the plate toward a center of the plate.

Representative Paragraph 4: The machine of any one of Representative Paragraphs 2-3, wherein the shroud is rigidly fixed to the plate such that the shroud and the plate rotate in the same direction and rotational speed.

Representative Paragraph 5: The machine of any one of Representative Paragraphs 2-3 where the shroud contacts the upper surface of the plate proximate to a center of the plate.

Representative Paragraph 6: The machine of any one of Representative Paragraphs 1-5, further comprising a second sensor disposed upon the housing, the second sensor monitors the plate within the interior volume, and is configured to identify the existence or the lack of an object upon the plate within the interior volume.

Representative Paragraph 7: The machine of any one of Representative Paragraphs 1-6, wherein the housing further comprises a fence positioned within the interior volume and disposed above the plate, wherein in operation when an object is disposed upon the plate, the rotation of the plate for a sufficient rotational angle causes the object to contact the fence, wherein contact between the object and the fence with continued rotation of the plate causes the object to slide along the fence until the object falls off of the plate.

Representative Paragraph 8: The machine of any one of Representative Paragraphs 1-7, wherein the sensor is further configured to identify when the object is passed into the void through the inlet opening.

Representative Paragraph 9: The machine of any one of Representative Paragraphs 1-8, wherein the sensor is an optical sensor.

Representative Paragraph 10: The machine of any one of Representative Paragraphs 1-9, further comprising a reader disposed upon the housing, the reader adapted to optically identify a machine readable image affixed to the object.

Representative Paragraph 11: The machine of Representative Paragraph 10, wherein the reader is configured to determine, based upon the machine readable image, whether the object is a food container and therefor whether the machine will accept the object for storage within the internal volume.

Representative Paragraph 12: The machine of Representative Paragraph 11, wherein the reader communicates with a controller that communicates with a non-volatile memory, wherein the non-volatile memory is programmed with data corresponding to machine readable images related to one or a plurality of types of food containers that can be accepted within the internal volume, based upon the identification of the machine readable image from the object.

Representative Paragraph 13: The machine of any one of Representative Paragraphs 10-12, wherein the machine readable image is a UPC symbol, a QR code, or a unique arbitrary image that is capable to being identified by the reader.

Representative Paragraph 14: The machine of Representative Paragraph 12, wherein the controller is configured to receive a signal from the sensor and the communication from the reader, wherein in operation, when the controller receives the communication from the reader and when the controller identifies that the object is a food container that will be accepted by the machine the controller causes the shroud and the plate to rotate until the void is aligned with the inlet opening in the housing, and when the sensor identifies the object extending through the inlet opening, the controller causes the plate to rotate causing the object to enter into the internal volume of the housing.

Representative Paragraph 15: The machine of Representative Paragraph 14, further comprising a second sensor disposed upon the housing, the second sensor monitors a portion of the plate extending within the interior volume, and the second sensor is configured to identify the existence or the lack of an object upon the plate within the interior volume, and wherein the second sensor sends a second signal to the controller upon the second sensor identifying the existence of the object upon the plate.

Representative Paragraph 16: The machine of any one of Representative Paragraphs 8-15, wherein the housing further comprises a fence positioned within the interior volume and disposed above the plate, wherein in operation when an object is disposed upon the plate, the rotation of the plate for a sufficient rotational angle causes the object to contact the fence, wherein contact between the object and the fence with continued rotation of the plate causes the object to slide along the fence until the object falls off of the plate, wherein the second sensor is positioned to identify and send the second signal when the object is proximate to contact with the fence or in contact with the fence.

Representative Paragraph 17: The machine of Representative Paragraph 16, wherein the controller causes the plate to discontinue rotating after the plate rotates a predetermined angle of rotation after the second signal is received.

Representative Paragraph 18: The machine of any one of Representative Paragraphs 1-17, further comprising a first switch that is selectively actuatable with rotation of the plate, wherein the first switch is actuated when the plate and the shroud are in a rotational position with respect to the housing so that the void is not aligned with the inlet opening of the house, such that the when the first switch is actuated shroud prevents objects from being put into the housing through the inlet opening.

Representative Paragraph 19: The machine of Representative Paragraph 18, wherein the controller discontinues rotation of the plate when the first switch is actuated.

Representative Paragraph 20: The machine of any one of Representative Paragraphs 18-19, wherein the controller causes the plate and shroud to rotate when the reader determines that the object is a food container based upon the optically identified machine readable image affixed to the object the controller causes the shroud and the plate to rotate until the void is aligned with the inlet opening in the housing, further comprising a second switch that is selectively actuatable with rotation of the plate, wherein the second switch is actuated when the plate and the shroud are in a rotational position with respect to the housing with the void of the housing aligned with the inlet opening of the housing.

Representative Paragraph 21: The machine of any one of Representative Paragraphs 12-20, wherein the controller causes the plate to rotate at a constant angular velocity.

Representative Paragraph 22: The machine of any one of Representative Paragraphs 1-21, wherein the housing is configured to receive a removable bin within the internal volume, wherein the removable bin is configured to receive objects that are positioned upon the plate.

Representative Paragraph 23: The machine of Representative Paragraph 22, wherein the housing is configured to direct objects toward the removable bin when the objects are urged off of the plate.

Representative Paragraph 24: The machine of Representative Paragraph 23, wherein the housing includes one or more ramp surfaces within the internal volume that urge objects within the bin to enter the removable bin in a specific orientation.

Representative Paragraph 25: The machine of Representative Paragraph 14, further comprising a first switch fixed with respect to the housing, wherein when the first switch is actuated, the plate and the shroud discontinue rotating and remain at a position where the shroud blocks the inlet opening, and further comprising a second switch fixed with respect to the housing, wherein when the second switch is actuated, the plate and the shroud discontinue rotating and remain at a position where the void of the shroud is aligned with the inlet opening.

Representative Paragraph 26: A method of receiving a plurality of food items, comprising:

using an electronic reader to read an image affixed to an object, and communicating data corresponding to the read image to a controller;

the controller compares the data received from the electronic reader with data that is stored within a non-volatile memory and corresponds to one or more of a plurality of types of food containers that can be received, and determines if there is a match between the data corresponding to the read image and the data corresponding to the one or more of the plurality of types of food containers that can be received stored within the non-volatile memory;

wherein a sensor that is disposed within a housing monitors an inlet opening within the housing and monitors whether the object is placed upon a plate positioned proximate to the inlet opening, wherein the sensor sends a signal to the controller when the sensor identifies that an object is placed upon the plate;

wherein when the controller determines that there is a match and receives the signal that the sensor has identified that the object is placed upon the plate, the controller causes the plate to rotate, wherein the plate includes a portion that extends to the inlet opening and a remaining portion that remains within an internal volume of the housing, wherein rotation of the plate causes the object to move into the internal volume of the housing and with continued rotation to fall off the plate and into a container positioned within the internal volume.

Representative Paragraph 27: The method of Representative Paragraph 26, further comprising a second sensor positioned within the internal volume and capable of identifying when the object rests upon the portion of the plate within the internal volume, the second sensor sending a second signal to the controller when the sensor identifies that the object rests upon the portion of the plate within the internal volume.

Representative Paragraph 28: The method of any one of Representative Paragraphs 26-27, wherein the plate comprises a shroud that extends along a majority of a circumference of the plate and void that exists where the shroud does not extend, wherein an item can be positioned into the inlet opening and onto the plate when the void of the plate is aligned with the inlet opening and items are prevented from being positioned upon the plate when the shroud is aligned with the inlet opening.

Representative Paragraph 29: The method of Representative Paragraph 28, wherein a space is defined between an upper surface of the plate and the shroud at the outer circumference of the plate, wherein the sensor is an optical sensor and has vision that extends through the space to monitor the existence or lack thereof of the object upon the portion of the plate that extends to the inlet opening.

Representative Paragraph 30: The method of Representative Paragraph 26, further comprising a shroud that is fixed to the plate, the shroud extending about a circumferential edge of the plate for a majority of a circumference of the plate, and the shroud including a void where the shroud does not extend about the circumferential edge of a portion of the plate, wherein sufficient rotation of the plate causes the plate to interact with a first switch that causes the plate to stop rotating at a position where the shroud blocks an inlet opening.

Representative Paragraph 31: The method of Representative Paragraph 30, wherein when the controller determines that there is a match, the controller causes the plate to rotate to a position where the void is aligned with the inlet opening, further comprising a second switch fixed to the housing, wherein the plate interacts with the second switch the plate and the shroud are stopped at a position where the void is aligned with the inlet opening.

Representative Paragraph 32: The method of any one of Representative Paragraphs 26-31, wherein the housing further comprises a fence positioned within the interior volume and disposed above the plate, wherein in operation when an object is disposed upon the plate, the rotation of the plate for a sufficient rotational angle causes the object to contact the fence, wherein contact between the object and the fence with continued rotation of the plate causes the object to slide along the fence until the object falls off of the plate, wherein the second sensor sends the second signal to the controller when the second sensor identifies the object upon the plate in a position proximate to the fence.

Representative Paragraph 33: A method of using a machine in accordance with any one of Representative Paragraphs 1-25 comprising, using an electronic reader to read an image affixed to an object, and communicating data corresponding to the read image to a controller;

the controller compares the data received from the electronic reader with data that is stored within a non-volatile memory and corresponds to one or more of a plurality of types of food containers that can be received, and determines if there is a match between the data corresponding to the read image and the data corresponding to the one or more of the plurality of types of food containers that can be received stored within the non-volatile memory;

wherein a sensor that is disposed within a housing monitors an inlet opening within the housing and monitors whether the object is placed upon a plate positioned proximate to the inlet opening, wherein the sensor sends a signal to the controller when the sensor identifies that an object is placed upon the plate;

wherein when the controller determines that there is a match and receives the signal that the sensor has identified that the object is placed upon the plate, the controller causes the plate to rotate, wherein the plate includes a portion that extends to the inlet opening and a remaining portion that remains within an internal volume of the housing, wherein rotation of the plate causes the object to move into the internal volume of the housing and with continued rotation to fall off the plate and into a container positioned within the internal volume.

Representative Paragraph 34: The method of Representative Paragraph 33, further comprising a second sensor positioned within the internal volume and capable of identifying when the object rests upon the portion of the plate within the internal volume, the second sensor sending a second signal to the controller when the sensor identifies that the object rests upon the portion of the plate within the internal volume.

Representative Paragraph 35: The method of any one of Representative Paragraphs 33-34, wherein the plate comprises a shroud that extends along a majority of a circumference of the plate and void that exists where the shroud does not extend, wherein an item can be positioned into the inlet opening and onto the plate when the void of the plate is aligned with the inlet opening and items are prevented from being positioned upon the plate when the shroud is aligned with the inlet opening.

Representative Paragraph 36: The method of Representative Paragraph 35, wherein a space is defined between an upper surface of the plate and the shroud at the outer circumference of the plate, wherein the sensor is an optical sensor and has vision that extends through the space to monitor the existence or lack thereof of the object upon the portion of the plate that extends to the inlet opening.

Representative Paragraph 37: The method of Representative Paragraph 33, further comprising a shroud that is fixed to the plate, the shroud extending about a circumferential edge of the plate for a majority of a circumference of the plate, and the shroud including a void where the shroud does not extend about the circumferential edge of a portion of the plate, wherein sufficient rotation of the plate causes the plate to interact with a first switch that causes the plate to stop rotating at a position where the shroud blocks an inlet opening.

Representative Paragraph 38: The method of Representative Paragraph 37, wherein when the controller determines that there is a match, the controller causes the plate to rotate to a position where the void is aligned with the inlet opening, further comprising a second switch fixed to the housing, wherein the plate interacts with the second switch the plate and the shroud are stopped at a position where the void is aligned with the inlet opening.

Representative Paragraph 39: The method of any one of Representative Paragraphs 33-38, wherein the housing further comprises a fence positioned within the interior volume and disposed above the plate, wherein in operation when an object is disposed upon the plate, the rotation of the plate for a sufficient rotational angle causes the object to contact the fence, wherein contact between the object and the fence with continued rotation of the plate causes the object to slide along the fence until the object falls off of the plate, wherein the second sensor sends the second signal to the controller when the second sensor identifies the object upon the plate in a position proximate to the fence.

The invention claimed is:

1. A machine to receive used food containers, comprising a housing that includes an interior volume and an outer shell, the housing comprises an inlet opening and an access opening into the housing;

a rotatable plate positioned within the housing and aligned with respect to the inlet opening such that items passed through the inlet opening are received upon the plate, the plate further comprises a shroud that extends along a majority of a circumference of the plate and a void that exists where the shroud does not extend, wherein an item can be positioned upon the plate when the void of the shroud is aligned with the inlet opening and items are prevented from being positioned upon the plate when the shroud is aligned with the inlet opening;

a sensor disposed upon the housing to monitor the inlet opening and identify when an object is placed upon the plate;

wherein the housing further comprises a fence positioned within the interior volume and disposed above the plate, wherein in operation when an object is disposed upon the plate, the rotation of the plate for a sufficient rotational angle causes the object to contact the fence, wherein contact between the object and the fence with continued rotation of the plate causes the object to slide along the fence until the object falls off of the plate.

2. The machine of claim 1, wherein a space is defined between an upper surface of the plate and the shroud at the outer circumference of the plate, wherein the sensor is an optical sensor and has vision that extends through the space to monitor the plate.

3. The machine of claim 2, wherein the space further is defined between a bottom edge of the shroud and the plate, as the shroud extends from the outer circumference of the plate toward a center of the plate.

4. The machine of claim 3, wherein the shroud is rigidly fixed to the plate such that the shroud and the plate rotate in the same direction and rotational speed.

5. The machine of claim 2 where the shroud contacts the upper surface of the plate proximate to a center of the plate.

6. The machine of claim 1, further comprising a second sensor disposed upon the housing, the second sensor monitors the plate within the interior volume, and is configured to identify the existence or the lack of an object upon the plate within the interior volume.

7. The machine of claim 1, wherein the sensor is further configured to identify when the object is passed into the void through the inlet opening.

8. The machine of claim 7, wherein the sensor is an optical sensor.

9. The machine of claim 1, further comprising a reader disposed upon the housing, the reader adapted to optically identify a machine readable image affixed to the object.

10. The machine of claim 9, wherein the reader is configured to determine, based upon the machine readable image, whether the object is a food container and therefor whether the machine will accept the object for storage within the internal volume.

11. The machine of claim 10, wherein the reader communicates with a controller that communicates with a non-volatile memory, wherein the non-volatile memory is programmed with data corresponding to machine readable images related to one or a plurality of types of food containers that can be accepted within the internal volume, based upon the identification of the machine readable image from the object.

12. The machine of claim 11, wherein the machine readable image is a UPC symbol, a QR code, or a unique arbitrary image that is capable to being identified by the reader.

13. The machine of claim 11, wherein the controller is configured to receive a signal from the sensor and the communication from the reader, wherein in operation, when the controller receives the communication from the reader and when the controller identifies that the object is a food container that will be accepted by the machine the controller causes the shroud and the plate to rotate until the void is aligned with the inlet opening in the housing, and when the sensor identifies the object extending through the inlet opening, the controller causes the plate to rotate causing the object to enter into the internal volume of the housing.

14. The machine of claim 13, further comprising a second sensor disposed upon the housing, the second sensor monitors a portion of the plate extending within the interior volume, and the second sensor is configured to identify the existence or the lack of an object upon the plate within the interior volume, and wherein the second sensor sends a second signal to the controller upon the second sensor identifying the existence of the object upon the plate.

15. The machine of claim 14, wherein the second sensor is positioned to identify and send the second signal when the object is proximate to contact with the fence or in contact with the fence.

16. The machine of claim 15, wherein the controller causes the plate to discontinue rotating after the plate rotates a predetermined angle of rotation after the second signal is received.

17. The machine of claim 15, further comprising a first switch that is selectively actuatable with rotation of the plate, wherein the first switch is actuated when the plate and the shroud are in a rotational position with respect to the housing so that the void is not aligned with the inlet opening of the house, such that the when the first switch is actuated shroud prevents objects from being put into the housing through the inlet opening.

18. The machine of claim 17, wherein the controller discontinues rotation of the plate when the first switch is actuated.

19. The machine of claim 18, wherein the controller causes the plate and shroud to rotate when the reader determines that the object is a food container based upon the optically identified machine readable image affixed to the object the controller causes the shroud and the plate to rotate until the void is aligned with the inlet opening in the housing, further comprising a second switch that is selectively actuatable with rotation of the plate, wherein the second switch is actuated when the plate and the shroud are in a rotational position with respect to the housing with the void of the housing aligned with the inlet opening of the housing.

20. The machine of claim 15, wherein the controller causes the plate to rotate at a constant angular velocity.

21. The machine of claim 1, wherein the housing is configured to receive a removable bin within the internal volume, wherein the removable bin is configured to receive objects that are positioned upon the plate.

22. The machine of claim 21, wherein the housing is configured to direct objects toward the removable bin when the objects are urged off of the plate.

23. The machine of claim 22, wherein the housing includes one or more ramp surfaces within the internal volume that urge objects within the bin to enter the removable bin in a specific orientation.

24. The machine of claim 13, further comprising a first switch fixed with respect to the housing, wherein when the first switch is actuated, the plate and the shroud discontinue rotating and remain at a position where the shroud blocks the inlet opening, and further comprising a second switch fixed with respect to the housing, wherein when the second switch is actuated, the plate and the shroud discontinue rotating and remain at a position where the void of the shroud is aligned with the inlet opening.

* * * * *